United States Patent [19]

Kim et al.

[11] Patent Number: 5,353,370
[45] Date of Patent: Oct. 4, 1994

[54] NON-UNIFORM TEMPERATURE PROFILE GENERATOR FOR USE IN SHORT DURATION WIND TUNNELS

[75] Inventors: Jungho Kim, Denver, Colo.; Michael G. Dunn; Charles W. Haldeman, both of East Aurora, N.Y.

[73] Assignee: Calspan Corporation, Buffalo, N.Y.

[21] Appl. No.: 30,592

[22] Filed: Mar. 11, 1993

[51] Int. Cl.⁵ .................................. H05B 3/10
[52] U.S. Cl. ......................... 392/485; 219/483; 219/553; 392/486
[58] Field of Search .............. 219/483, 485, 552, 553; 392/485, 482, 486, 490, 493

[56] References Cited

U.S. PATENT DOCUMENTS

| | | | |
|---|---|---|---|
| 1,294,695 | 2/1919 | Osterheld | 392/482 |
| 1,304,365 | 5/1919 | Powell | 392/410 |
| 3,163,841 | 12/1964 | Willett | 392/485 |
| 3,474,229 | 10/1969 | Rump | 392/485 |
| 3,593,002 | 7/1971 | Herbert . | |
| 3,770,389 | 10/1973 | Kitzner | 392/488 |
| 3,904,851 | 9/1975 | Gustafson | 392/485 |
| 3,995,143 | 11/1976 | Hervert . | |
| 4,232,214 | 11/1980 | Shioi . | |
| 4,237,697 | 12/1980 | Cherbland . | |
| 4,281,238 | 7/1981 | Noma . | |

*Primary Examiner*—Teresa J. Walberg
*Attorney, Agent, or Firm*—Biebel & French

[57] ABSTRACT

Apparatus for producing a non-uniform temperature profile in a short duration wind tunnel includes a plurality of nested cylindrical elements each having an inlet end and an outlet end, a plurality of heater element extending axially along the surface of each of the cylindrical elements. The length and thermal mass of the cylindrical elements permits the temperature of test gasses to be raised to the desired level while the gasses are passing over those elements. A plurality of honeycomb elements occupy the space between each of the cylindrical elements to distribute the heating effects smoothly both radially and circumferentially. Each heater is controlled individually by a control circuit in order to establish the desired temperature profile at the outlet end of the apparatus.

3 Claims, 8 Drawing Sheets

NON-UNIFORM TEMPERATURE PROFILE GENERATOR FOR USE IN SHORT DURATION WIND TUNNELS

BACKGROUND OF THE INVENTION

This invention relates to a heater device that is disposed in the gas flow path of a short duration wind tunnel to modify the temperature profile of the gas exiting the heater element.

Recent gas turbine research has centered around using a shock tunnel or a pressurized supply tank as a short duration source of heated, pressurized gas to duplicate the corrected flow conditions (flow function and corrected speed) encountered in the gas turbine environment. All of the measurement programs conducted to date by the present assignee of this application have used actual engine hardware. The temperature profile at the inlet of a high pressure turbine vane row has been very uniform by design. It is well known that a non-uniform temperature profile at the high pressure turbine vane inlet would better represent the exit profile of an upstream combustor. However, until this time, the experimental sophistication had not advanced to the point where such a non-uniform profile could be properly utilized.

There is therefore a need for a heater that could be placed in the entry duct leading to the turbine stage such that a non-uniform temperature distribution could be produced. The desired exit temperature profile would be parabolic in the radial direction with the centerline temperature approximately 100° R higher than the temperature of the incoming flow.

SUMMARY OF THE INVENTION

The present invention relates to a novel apparatus for producing a non-uniform temperature profile in a short duration wind tunnel.

There are several parameters to be considered in the design of the heater. One is flow blockage. Although more than sufficient pressure head is available, a minimum of blockage is desired. More importantly, the heater should produce a uniform velocity profile. If the blockage is significant, it should be as uniform as possible.

A second parameter is turbulence effect on the flow field. The turbulence intensity at the exit of the heater should not be significantly above the inlet turbulence intensity. A settling region with fine mesh, large open area ratio screens downstream of the heater could be provided if the turbulence intensity is too high or is non-uniform.

A third parameter is frequency response. Two approaches to heating the flow are possible. The first is to use a very low thermal inertia, fast response heating element (i.e., a heating element whose time constant is significantly shorter than the test duration) and use a feedback circuit to keep the element temperature constant. This option provides the possibility of dynamically varying the exit temperature of the gas during the test. It does require, however, that the large amount of power be expended to heat the gas be supplied for the duration of the test time. The second approach is to use an element with enough thermal mass so that its temperature does not change significantly during the test time. The advantage of using this approach is that the heater element need only be brought up to temperature before the test gas arrives. The pre-heating can occur at much lower power levels than would be required for the low thermal inertia heater element.

A fourth parameter is ease of fabricability and cost.

In the preferred embodiment of the invention, the apparatus includes a plurality of concentric cylinders each having an inlet end and an outlet end and each provided with a plurality of circumferencially spaced heater element extending axially along the surface of each of the cylinders to heat the cylinders in the immediate vicinity of each heater element. A metallic honeycomb element occupies the space between each of the cylindrical elements and the center of the central cylinder. Each of the heater elements is individually controlled to control the temperature profile at the outlet end of the apparatus.

It is therefore an object of this invention to provide a non-uniform temperature profile generator having sufficient length and thermal mass to heat test gasses passing through the generator to the desired temperatures at specific locations.

It is a further object of this invention to provide an apparatus for producing a non-uniform temperature profile in a short duration wind tunnel, the apparatus comprising a plurality of nested cylindrical elements each having an inlet end and an outlet end, a plurality of heater elements extending axially along the surface of each of the cylindrical elements, a plurality of honeycomb elements occupying the space between each of the cylindrical elements, and means for controlling individually each of the heater elements to control the temperature profile at the outlet end of the apparatus.

Other objects and advantages of the invention will be apparent from the following description, the accompanying drawings and the appended claims.

DESCRIPTION OF THE PREFERRED EMBODIMENT

Referring now to the drawings, the non-uniform profile generator is basically a heater element, shown generally at 10, that includes several concentric cylindrical tubes, including an outer cover tube 15 and inner tube elements 20a, 20b and 20c. While three inner tube elements are shown, it should be understood that any number could be used, depending on the temperature profile desired. The tubes have a common inlet end 25 and a common outlet end 30.

Figure 1:
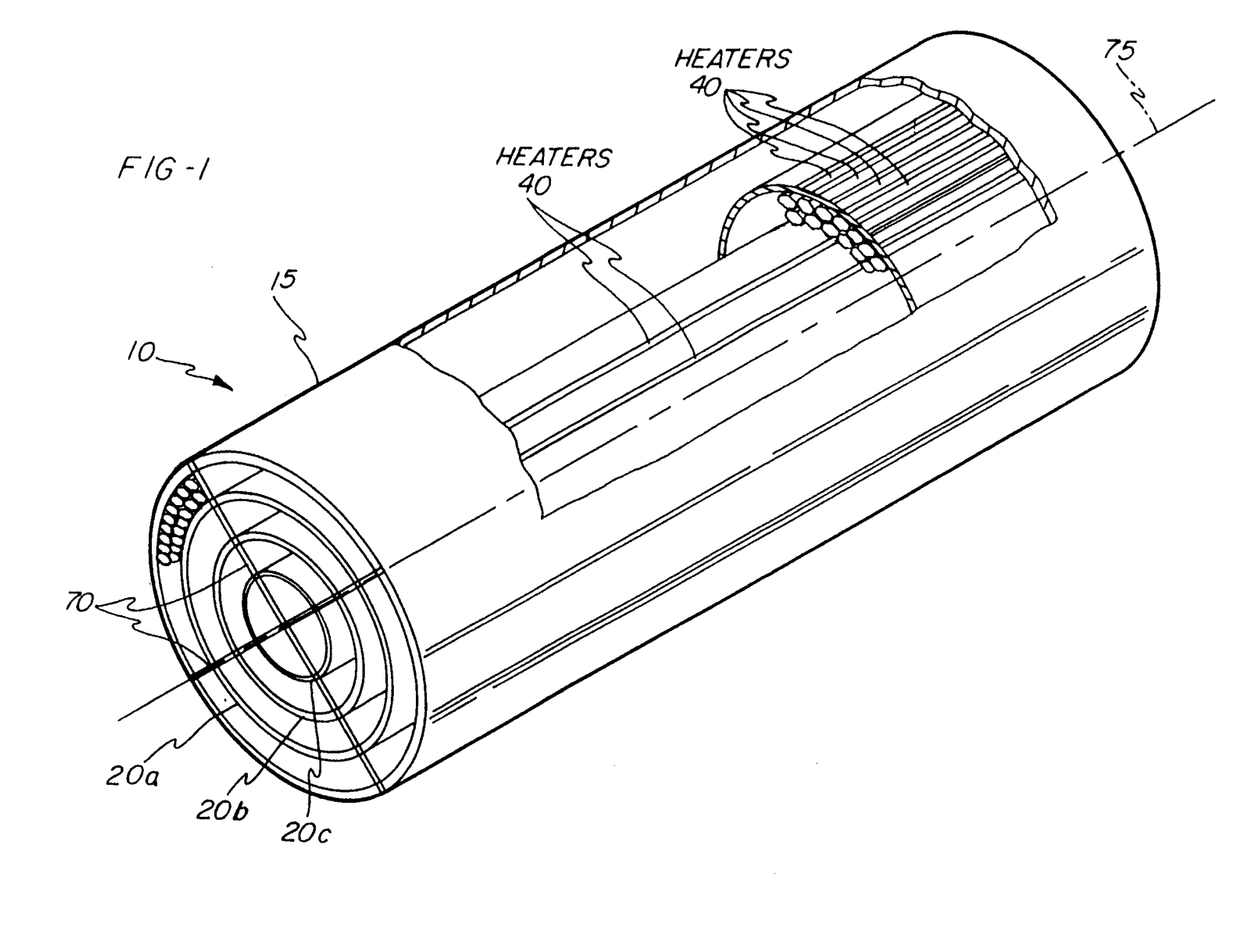
FIG. 1 is a perspective view of a temperature profile generator constructed according to the present invention.
Figure 2:
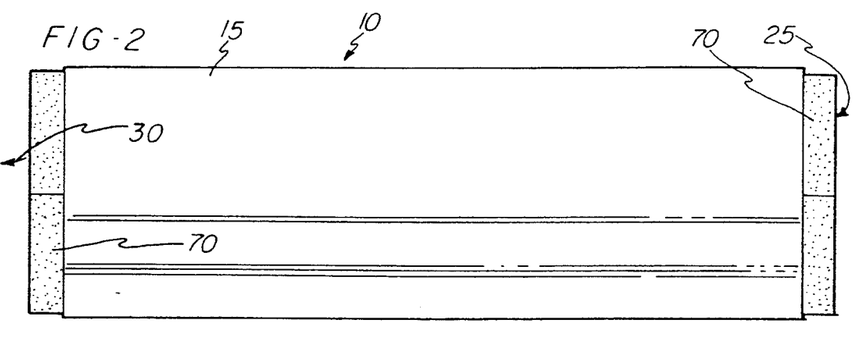
FIG. 2 is a side elevational view of the temperature profile generator.
Figure 3:
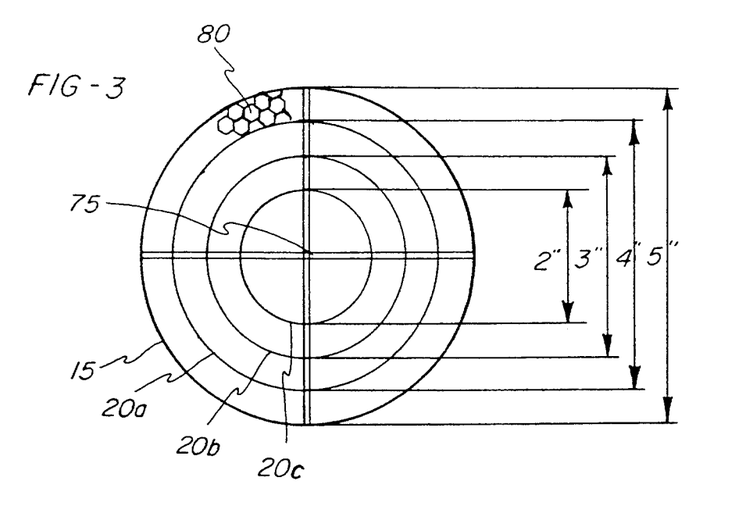
FIG. 3 is an end view of the invention.
Figure 4:
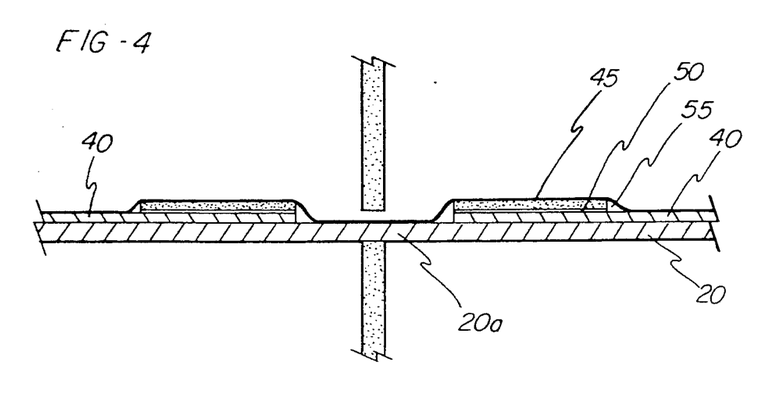
FIG. 4 is a detailed view showing the method of attaching heater elements mounted to an aluminum tube.
Figure 5:
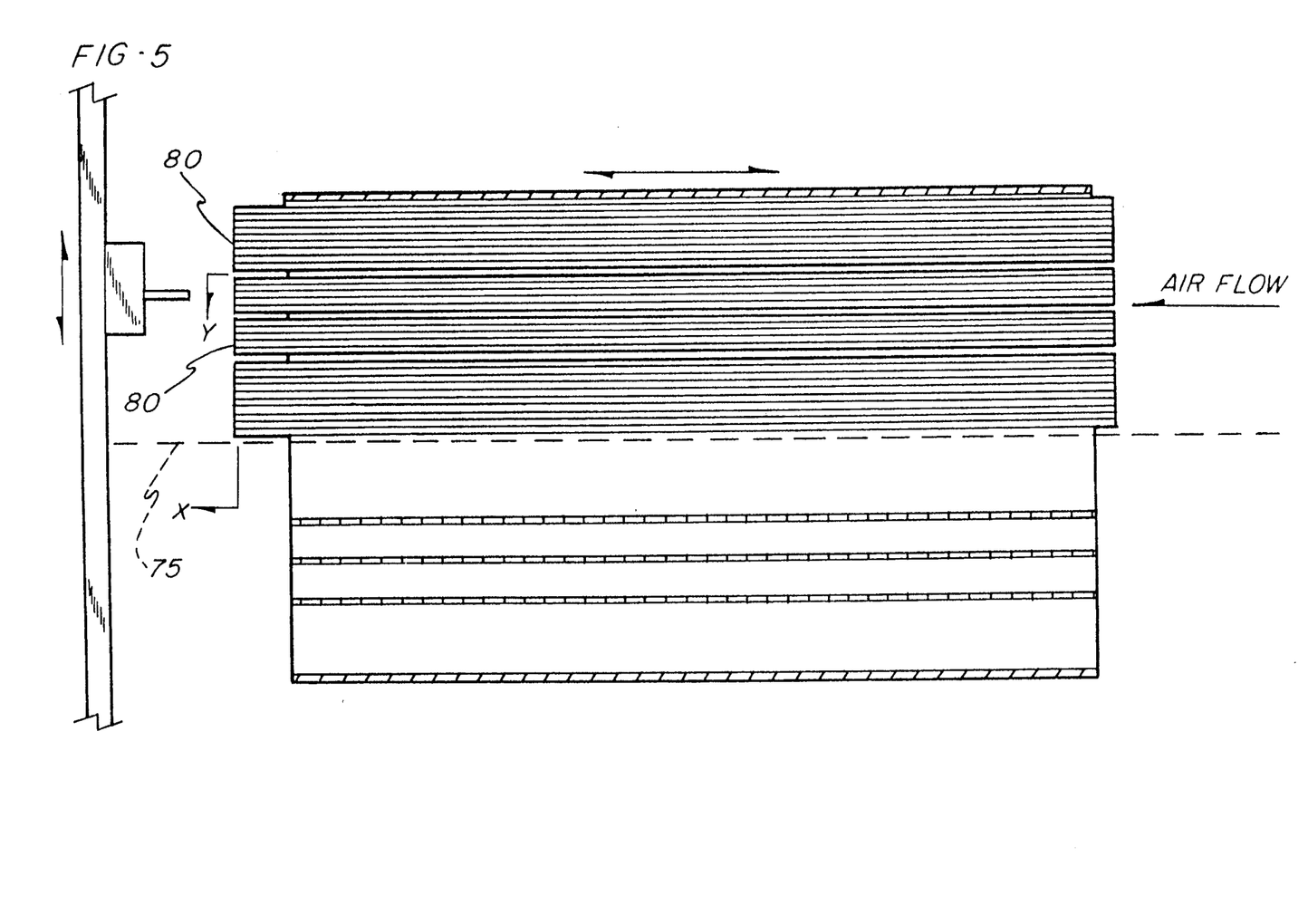
FIG. 5 is a cross sectional view of the invention.

A plurality of circumferencially spaced heater elements 40 extend axially along the surface of each of the tubes to heat the tubes in the immediate vicinity of each heater element. As shown in FIG. 4, each heater element is placed adjacent the surface of the tube and is covered with a layer of Kapton tape 45 and secured to the tube by means of a high temperature epoxy 50. For each heater element, a voltage tap 55 is provided, and there is one or more Ch-Al thermocouple 60 associated with each heater element.

Mica inserts 70 are placed at each end of the tubes to hold the tubes in spaced-apart relation, thus maintaining them concentric about an axis 75 through the center of the generator 10.

Metallic honeycomb elements 80 occupy the space between each of the tubes or cylindrical elements and the center of the central tube 20c. These elements are in thermal contact with each of the tubes 15 and 20 and are provided with straight through openings through which test gas may pass. With this construction, the heating effect of each heater element 40 is distributed evenly from one tube to another in the radial direction and from one heater to another in the circumferential direction.

Figure 6:
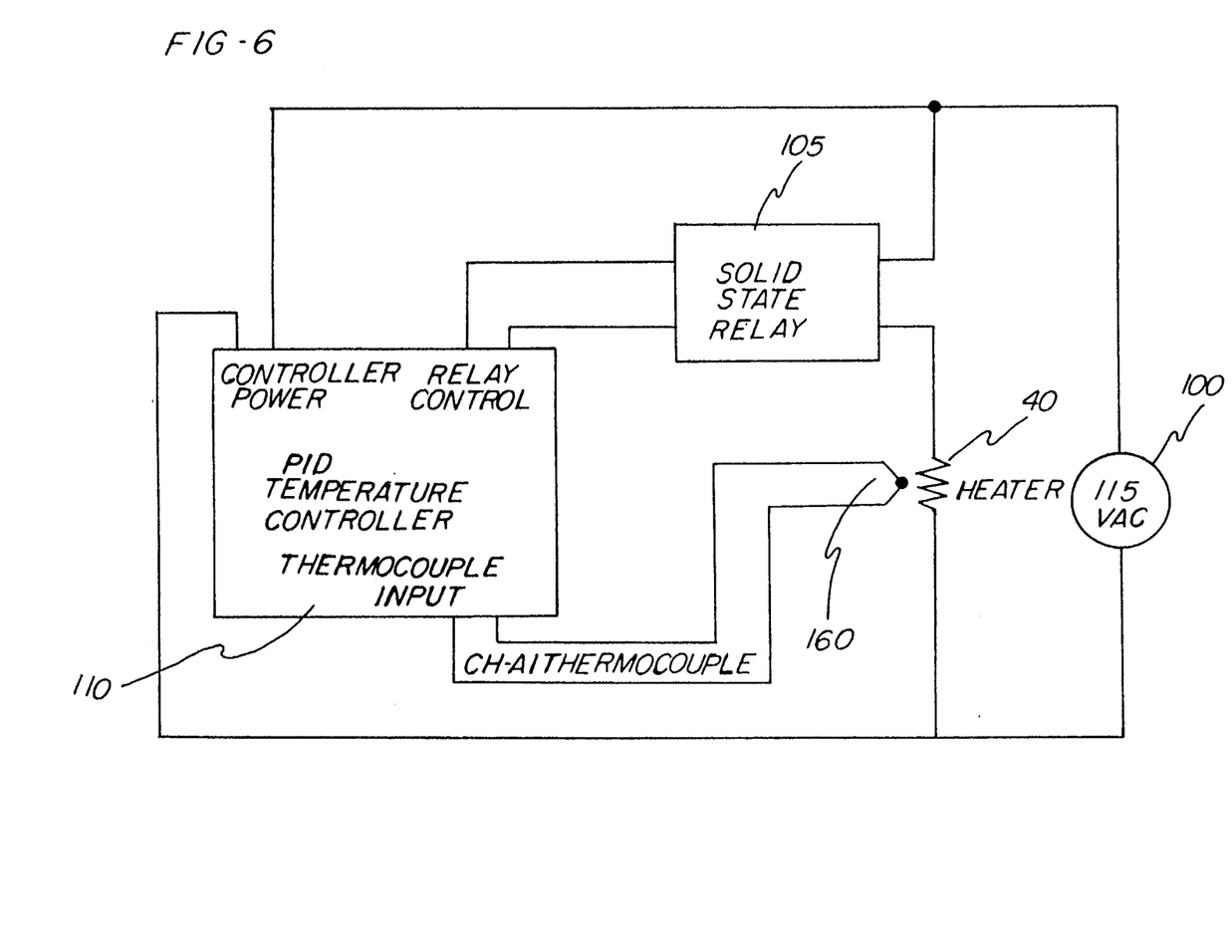
FIG. 6 is an electrical block diagram of a heater controller for each of the heater elements employed in the profile generator.

Each heater element 40 is individually controlled to control the temperature profile of the test gas at the outlet end of the apparatus. A circuit diagram for each individual heater is shown in FIG. 6. A source of power 100, typically from commercial mains, is applied through a solid state relay 105 to a heater 40. A thermocouple 65 senses the temperature of the heater and provides a signal to a controller 110 which in turn controls the operation of the relay 105, thus to maintain the heater at a predetermined temperature. The controller is a proportional-integral-derivative (PID) type with a cycle time of 1 second. Very little power was required to keep the heater elements at the test temperature of 120° F.

As shown, the non-uniform temperature profile generator or heater of the present invention has an overall length of 12 inches, the outer tube has a diameter of 5 inches, and the heated tubes 20a–20c and 4, 3 and 2 inches in diameter, respectively. Each tube is constructed from 0.035 inch thick aluminum.

While the dimensions of a typical embodiment of the heater have been given above, a more generalized consideration of the dimensions is provided below, with reference to FIGS. 11 and 12. The specific dimensions of the heater can be changed to meet the particular application in accordance with the discussion given below.

Consider a heater tube heater element of diameter d, wall thickness $t_w$ and length L. The thermal inertial of device should be massive enough so that the heater temperature does not change appreciably during the test. The heater should also be long enough to transfer the energy stored in the heater to the gas flow.

The equations which follow use the definitions in Table I.

TABLE I

| Nomenclature | |
|---|---|
| A | area |
| Bi | Biot number |
| C | specific heat |
| $d^p$ | Diameter |
| h | heat transfer coefficient |
| k | thermal conductivity |
| M | Mach number |
| m | mass |
| Nu | Nusselt number |
| P | power or pressure |
| Pr | Prandtl number |
| q | heat |
| r | radius |
| Re | Reynolds number |
| T | temperature |
| t | time or thickness |
| V | volume |
| x | axial distance |
| Ω | Ohms |
| ρ | density |
| τ | time constant |
| Superscripts | |
| '' | per unit area |
| . | per unit time |
| Subscripts | |
| a | air |
| h | hydraulic |
| i | initial value |
| p | pipe |
| s | solid |
| t | time |
| w | wall |
| ∞ | freestream value |

Figure 11:
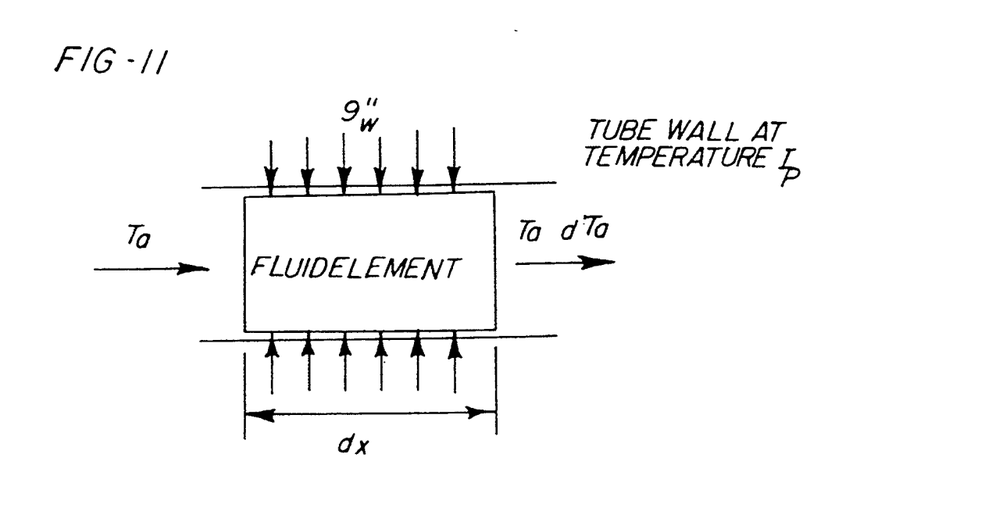
FIG. 11 is a schematic showing the energy balance on a differential fluid element.
Figure 12:
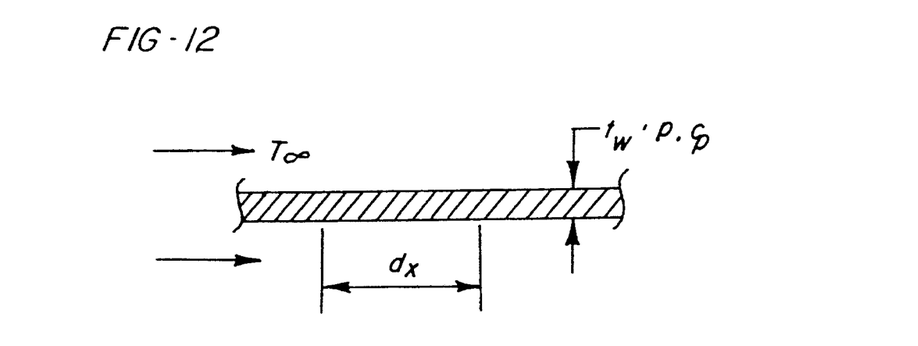
FIG. 12 is a schematic showing the energy balance on a heater wall.

The minimum heater length required can be determined from an energy balance on a fluid element as shown in FIG. 11.

$$\dot{q}_w = h\pi d(dx)[T_p - T_a(x)] = \dot{m}c_p d(T_a(x))$$

The average air temperature with length can be solved to obtain $$\frac{T_a(x) - T_a(0)}{T_p - T_a(0)} = 1 - \exp\left(-\frac{h\pi d}{\dot{m}c_p}x\right)$$

where the "length constant" $\tau_x$ is given by $$\tau_x = \frac{\dot{m}c_p}{h\pi d} = \frac{\rho dvc_p}{4h}.$$

The length constant is the length required to decrease the pipe to air temperature difference to 1/e of its initial value. The heater length should therefore be large compared to the length constant.

The minimum heater thickness can be estimated from an energy balance on the element. (FIG. 12).

$$-c_p m dT = hA(T - T_\infty)dt$$

which can be solved to obtain the temperature distribution with time as $$\frac{T - T_\infty}{T_i - T_\infty} = \exp\left(-\frac{hA}{c_p m} t\right).$$

The time constant, $\tau_t$, is thus $$\tau_t = \frac{mc_p}{hA} = \frac{t_w \rho c_p}{2h}.$$

The heater time constant should be large compared to the test time in order for the wall temperature to remain relatively constant during the test. The heater transfer coefficient can be obtained assuming turbulent flow in pipes (Re=3.56×10$^5$) from $Nu = 5 + 0.015 Re^a Pr^b$ where $a = 0.88 - 0.24/(4 + Pr)$ $b = 0.333 + 0.5 \exp(-0.6 Pr)$.

Finally, the Biot number given by $$Bi = \frac{h t_w}{k_s}$$

must be small in order for the heater wall temperature to remain uniform.

Assume a set of concentric heated elements separated by 0.5 in. The hydraulic diameter ($D_h$) of the annuli between the heater elements is then $D_h = 1.0$ in. For the test conditions of P=100 psia and T=1000° R, and a Mach number of M=0.1, the Reynolds and Nusselt number can be calculated to be 180,700 and 275, respectively. For a heater wall thickness of 30 mils (0.030 in), the heater length and time constants can then be calculated to be $t_w = 115$ in and $t_t = 2.03$ s, respectively. The time constant is much longer than the test time of 40 ms, implying that the heater wall temperature will decay very little during a typical test time. A very long heater (much longer than the space available) will be needed, however, to bring the air temperature up to anywhere close to the wall temperature.

Assume the same heater as discussed above is used, but with aluminum honeycomb inserts (cell diameter of ⅛ in, wall of 5 mils) between the heating elements. For the same condition as above, the Reynolds and Nusselt numbers can be calculated to be 22,588 and 53.2, respectively, yielding heater length and time constants of $t_x = 9.25$ in and $t_t = 0.219$ s. The length constant is reasonable and heater lengths of twice $t_w$ can easily be accommodated in the model.

Figure 7:
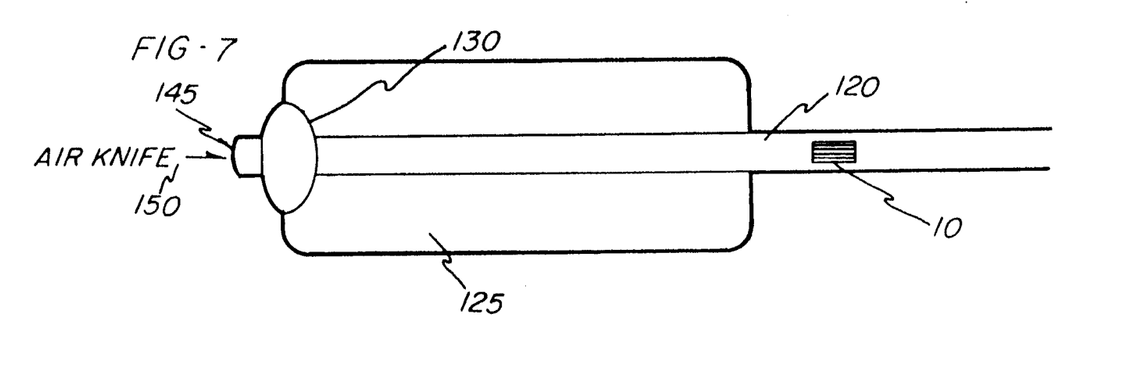
FIG. 7 is a schematic diagram showing the profile generator of the present invention mounted in a Ludweig tube.

Heater qualification tests were performed in a Ludweig tube 120 to generate short-duration overpressures at the face of an operating gas turbine engine. A schematic of this facility is shown in FIG. 7. Compressed air is stored in a driver tube 125 and a flexible neoprene diaphragm 130 is used to separate the driver gas from the gas in the shock tube 120. The pressure to which the driver tube is loaded determines the magnitude of the overpressure pulse and thus the temperature pulse. An actuating chamber 140 isolates the supply tube from the shock tube for pressurization.

When a mylar diaphragm 145 is punctured with an air knife 150, the actuating chamber pressure rapidly decreases and releases the neoprene diaphragm. (The sharpness of the shock front can be tuned by changing the vent area of the actuating chamber, or by varying the mylar diaphragm thickness.) The driver-tube air then expands into the shock tube and forms a shock wave a short distance from the driver tube inlet. The shock, followed by shock-processed air, propagates down the shock tube past the profile generator or heater 10. The flexible diaphragm allowed repeated runs to be made easily by simply replacing the ruptured mylar diaphragm.

Figure 8:
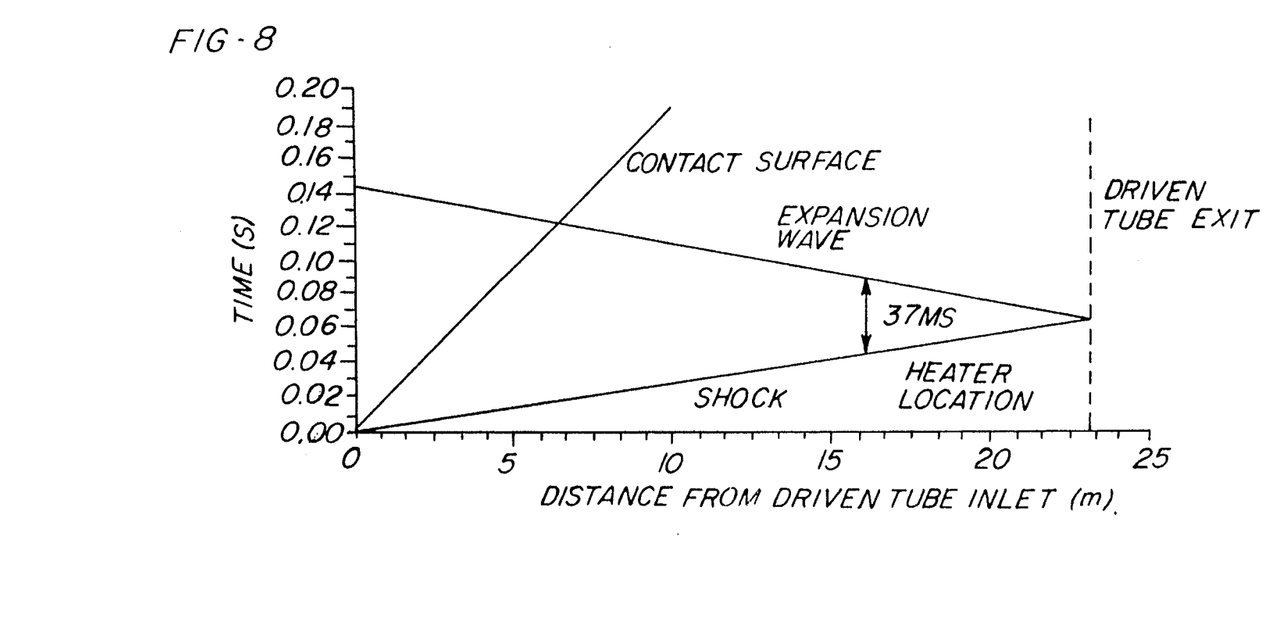
FIG. 8 is a wave diagram showing the relationship between the distance from the tube inlet and time in the Ludweig tube of FIG. 7.
Figure 9A:
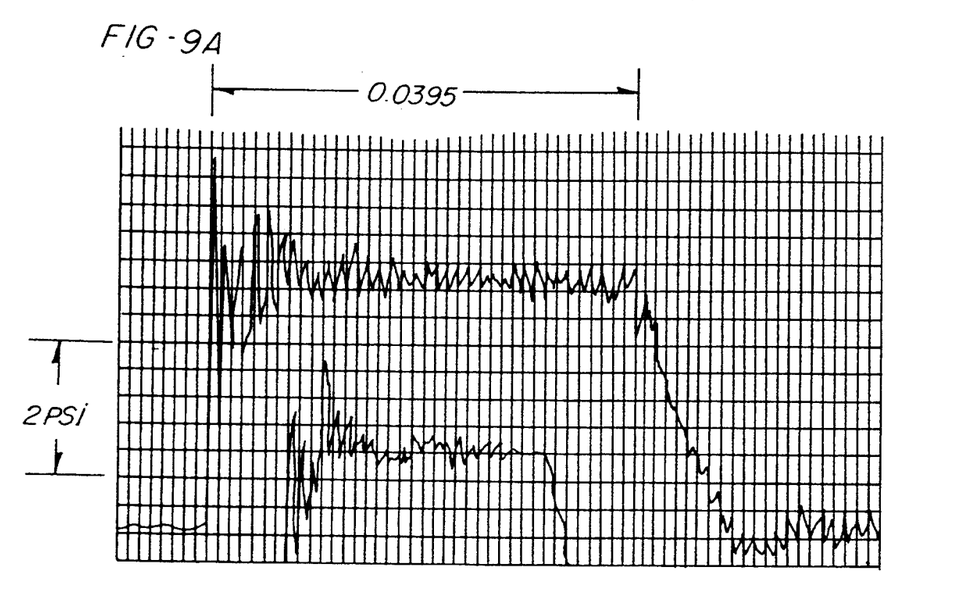
FIGS. 9A and 9B are pressure and temperature output waveforms representing the output from the present invention.
Figure 9B:
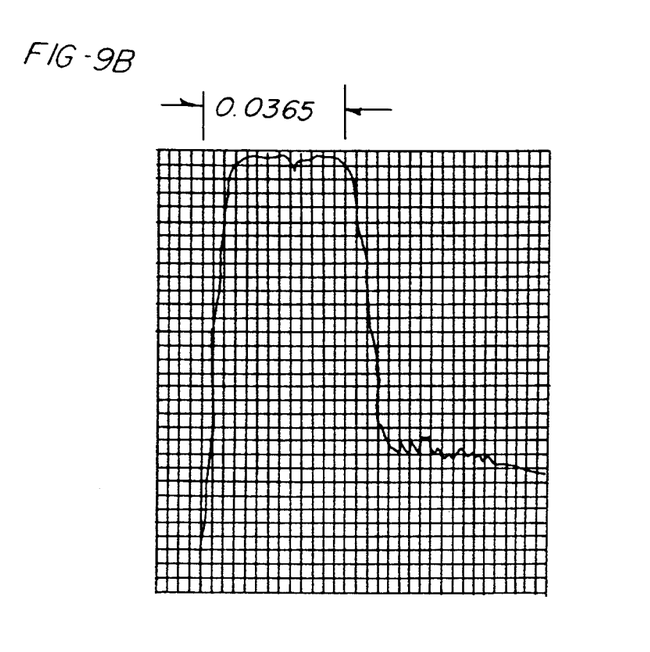

A wave diagram for the facility (5 psig driver pressure) is shown in FIG. 8. The Mach number across the initial shock front was determined using the measured static pressure rise across the shock. Typical temperature and pressure records obtained in this facility without the heater in place at a location ~6.9 m upstream of the shock tube exit is presented in FIG. 9. The pressure record is observed to have a periodic signal superimposed upon it. When the driven tube was struck with a hammer, the frequency of the pressure transducer output was observed to be close to that in FIG. 9a, suggesting that pipe resonance is the source of this periodic signal. A filter could have been used to eliminate this signal. The temperature behind the shock is very uniform, as seen from the temperature record (FIG. 9b). The thermocouple probe is seen to have a rise time much smaller than the test duration. Both pressure and temperature records show test times of ~37 ms for this location, in excellent agreement with the test time predicted from the wave diagram. These results demonstrate that this Ludweig tube provides an excellent environment within which to qualify the heater.

The Reynolds number at which the heater will eventually be used is ~6.9×10$^6$, based on a test section Mach number of 0.1 and an arbitrary length of 1 m. For the Ludweig tube, a driver tube pressure of 5 psia results in a pressure ratio across the normal shock of 1.25. For a heater placed in this environment, a Reynolds number of 3.1×10$^6$ can be obtained, again based on a length of 1 m. The two Reynolds numbers are close enough for the demonstration of principle process.

The heater was qualified for driven tube and driver tube pressures of 14.7 psia and 19.7 psia, respectively for all cases. The air temperature behind the initial shock wave is 1.065 times the initial driven tube air temperature (~523° R), resulting in inlet air temperatures to the heater of −557° R. The air velocity behind the initial shock was 128 ft/s. Under these conditions, the heater length and time constants are 9.1 in and 0.656 s, respectively, The heater to inlet air temperature difference is expected to decay the 0.97 of the initial temperature difference at the end of the test time:

$$\frac{T_f - T_\infty}{T_i - T_\infty} = \exp\left(-\frac{hA}{c_p m} t\right) = 0.97.$$

The exit air to inlet air temperature difference reaches 0.67 of the pipe to inlet air temperature difference:

$$\frac{T_d(x_{exit}) - T_d(0)}{T_p - T_d(0)} = 1 - \exp\left(-\frac{h \pi d}{\dot{m} c_p} x_{exit}\right) = 0.67.$$

For an inlet air temperature of ~557° and initial honeycomb temperature of 587° R (all heaters were at this temperature throughout the qualification), the exit air temperature is expected to be −577° R. During the test time of 40 ms, the honeycomb temperature can be expected to decay from 587° R to 486° R for the honeycomb wall thickness used, a negligible amount.

Figure 10:
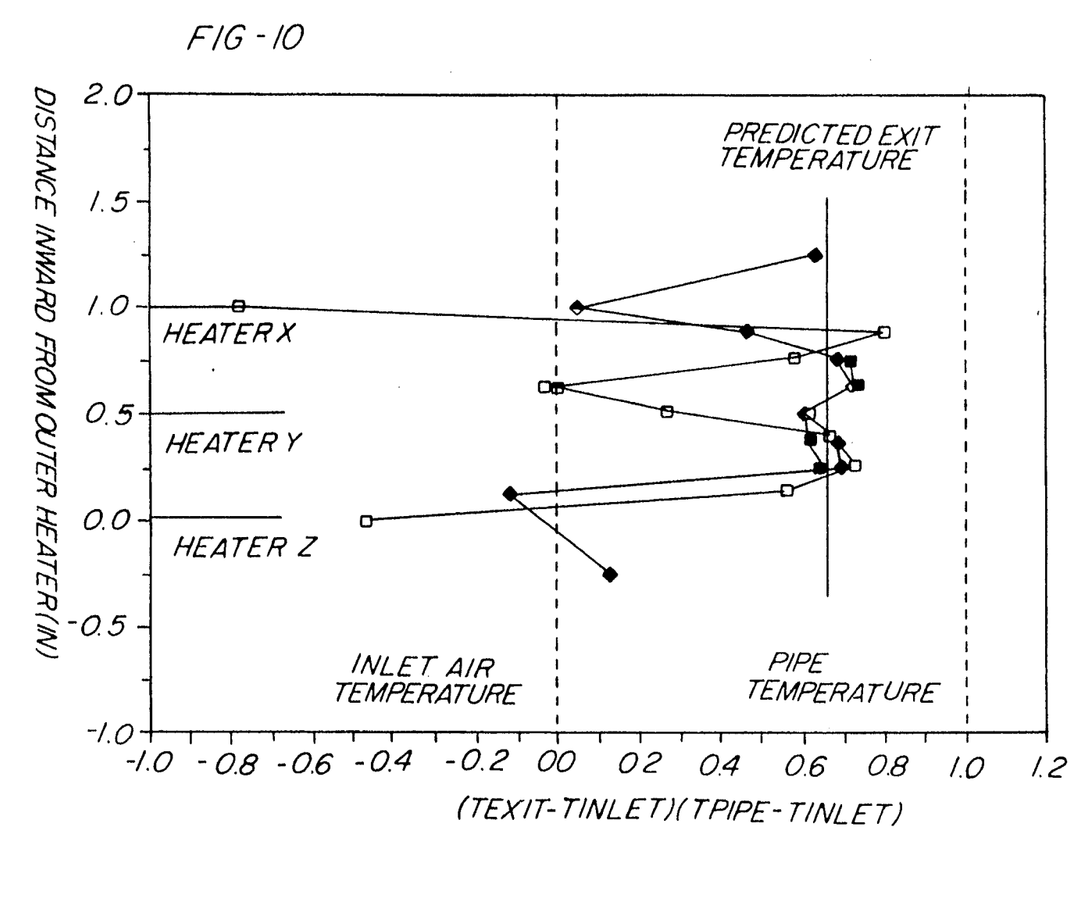
FIG. 10 is a non-dimensional air temperature profile chart showing the temperatures at the exit of the profile generator of the present invention as determined by each of the independent heaters.

Results of three traverses of the thermocouple rake at distance ⅛ in, and ½ in, and ¾ in from the exit plane of the heater are shown in FIG. 10. The exit temperature data have been normalized on the initial heater to inlet air temperature difference to remove diurnal variations. Focusing on the ⅛ in traverse, it is seen that although the exit temperatures are in good agreement with the predicted values behind the heaters, a drop in temperature is seen whenever the rake is placed directly behind a heater. This result is attributed to a small pocket of cold air trapped between the honeycombs as they protrude from the back of the cylinders. If this argument is true, then this temperature excursion should decrease as the probe is moved away from the heater exit. As expected, less of an excursion is seen for the ½ in and ¾ in traverses. For all three traverses, temperatures behind the heater are in very good agreement with the predicted temperatures.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. Apparatus for producing a non-uniform temperature profile in a short duration wind tunnel, said apparatus having an inlet end and an out end, said apparatus comprising a plurality of spaced apart, nested cylindrical elements each having an inlet end and an outlet end corresponding to said inlet end and said outlet end of said apparatus, and each having a different diameter, a plurality of heater elements extending axially along a surface of each of said cylindrical elements, a plurality of honeycomb elements occupying the space between said cylindrical elements, means for controlling individually each of said heater elements to control a temperature profile at the outlet end of said apparatus.

2. The apparatus of claim 1 wherein each cylindrical element has a length and thermal mass selected to provide a desired increase in temperature at the outlet end of said apparatus.

3. Apparatus for producing a non-uniform temperature profile in a short duration wind tunnel, said apparatus having an inlet end and an out end, said apparatus comprising a plurality of spaced apart concentric cylinders of different diameters each having an inlet end and an outlet end corresponding to said inlet end and said outlet end of said apparatus, a plurality of circumferentially spaced heater element extending axially along a surface of each of said cylinders, honeycomb elements occupying the space formed between each of said cylindrical elements, and means for controlling individually each of said heater elements to control a temperature profile at the outlet end of said apparatus.

* * * * *